United States Patent
Becker

(10) Patent No.: US 6,734,882 B1
(45) Date of Patent: May 11, 2004

(54) COMBINED MENU-LIST CONTROL ELEMENT IN A GRAPHICAL USER INTERFACE

(75) Inventor: Thomas W. Becker, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 616 days.

(21) Appl. No.: 09/672,102

(22) Filed: Sep. 29, 2000

(51) Int. Cl.$^7$ ................................................. G06F 3/00
(52) U.S. Cl. ........................ 345/815; 345/744; 345/765; 345/788; 345/800
(58) Field of Search .................... 345/744, 762, 345/764, 765, 783, 784, 786, 788, 800, 810, 815, 828, 829, 830, 835, 840, 846, 866

(56) References Cited

U.S. PATENT DOCUMENTS

| | | | |
|---|---|---|---|
| 5,327,529 A | * 7/1994 | Fults et al. | 345/762 |
| 5,438,659 A | 8/1995 | Notess et al. | 715/505 |
| 5,630,074 A | * 5/1997 | McLaughlin | 345/734 |
| 6,084,585 A | * 7/2000 | Kraft et al. | 345/733 |
| 6,121,968 A | * 9/2000 | Arcuri et al. | 345/825 |
| 6,133,915 A | * 10/2000 | Arcuri et al. | 345/779 |
| 6,232,972 B1 | * 5/2001 | Arcuri et al. | 345/815 |
| 6,300,967 B1 | * 10/2001 | Wagner et al. | 345/784 |

OTHER PUBLICATIONS

Lincoln D. Stein, "Navigation bars made easy," Dec. 1997, Miller Freeman, vol. 2, No. 12, p. 8–10.*

J. Rodley, "Developing GUIs for database applications," Jun. 1994, Dr. Dobb's Journal, vol. 19, No. 6, p. 18–20, 22, 24–5, 92.*

Collapsible Menu Bar for a Graphical User Interface Application, IBM Technical Disclosure Bulletin, Jan. 1996, p. 93, vol. 39, No. 1, New York, USA.

Architecture for Platform and Presentation Independent User Interface for Applications, IBM Technical Disclosure Bulletin, Jan. 1995, pp. 297–302, vol. 38, No. 01, New York, USA.

Maximizing Scrollable List Boxes, Research Disclosure, Jul. 1992, p. 586, No. 33988, Emsworth, GB.

Selectable Dynamic Drop–Down List Boxes, IBM Technical Disclosure Bulletin, Dec. 1995, pp. 405–406, vol. 38, No. 12, New York, USA.

* cited by examiner

*Primary Examiner*—John Cabeca
*Assistant Examiner*—X. L. Bautista
(74) *Attorney, Agent, or Firm*—Burns, Doane, Swecker & Mathis, L.L.P.

(57) ABSTRACT

A control element for use in a graphical user interface, which combines the display features of the list box element and the pop-up menu element into a single GUI control element. The combined menu list control element is capable of displaying data in multiple states thereby allowing to it to optimally use the available display space for presenting data to the user. By allowing menu list control element to display data as either a list or a menu, it combines the advantages of lists and menus while avoiding their disadvantages.

31 Claims, 4 Drawing Sheets

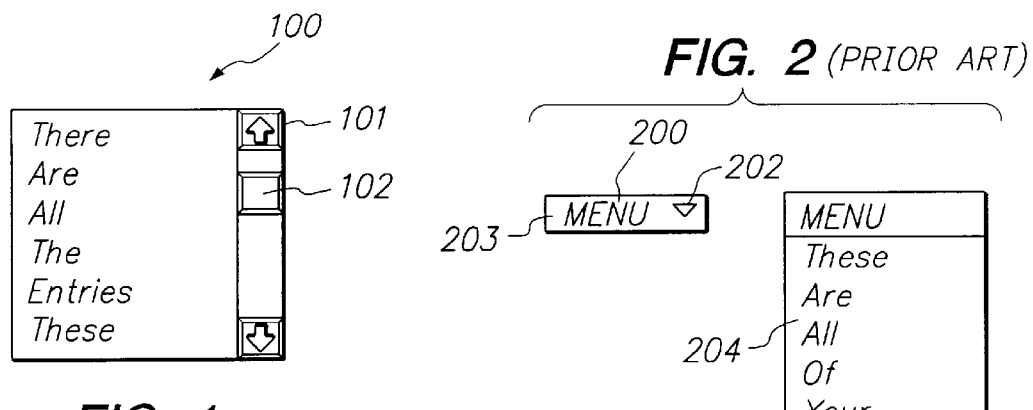
FIG. 1 (PRIOR ART)
FIG. 2 (PRIOR ART)
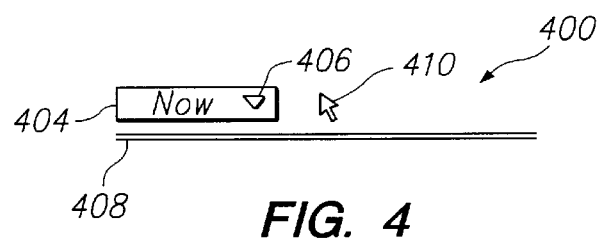
FIG. 4
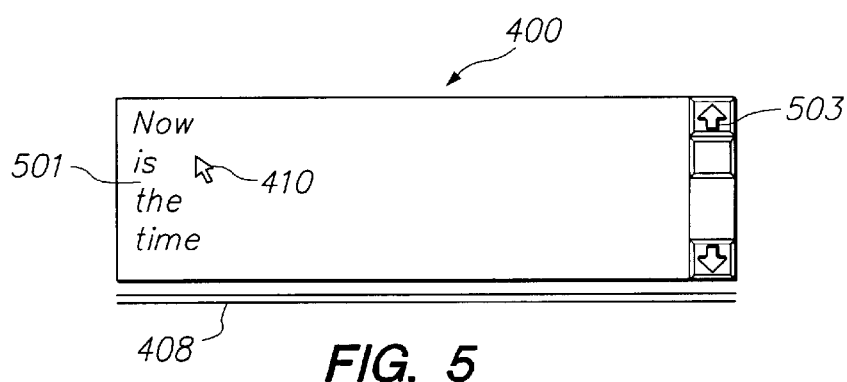
FIG. 5

COMBINED MENU-LIST CONTROL ELEMENT IN A GRAPHICAL USER INTERFACE

FIELD OF THE INVENTION

The present invention relates generally to graphical user interfaces for computer systems. More particularly, the present invention relates to control elements which, among other things, combine features of a menu element and a list element within a graphical user interface.

BACKGROUND

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application designers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these and other new resources at their disposal, application designers and users alike, demand additional functionality and greater ease of use from the desktop environment.

Today it is hard to imagine an operating system or application which does not provide a GUI. A system's or application's GUI along with the other man machine interface (MMI) elements is often referred to as its "look and feel." Accordingly, developers of today's applications typically use the control elements of the operating system or platform GUI, adding their own GUI elements and ideas, to differentiate their application from other, competing applications being developed. Elements of a GUI include such things as windows, menus, lists, buttons, scroll bars, icons, pointers, etc. Two well known GUI control elements are the "pop-up menu" and "list box", both of which have advantages and disadvantages which are discussed below.

An exemplary GUI control element commonly referred to as a list box is shown in FIG. 1. The list box control element generally requires the specification of the number of visible rows in a viewing area 100. The number of visible rows specified does not limit the number of possible entries which can be displayed within the list box, rather it affects the height of the displayed list box. If more entries are entered (i.e., more data is to be presented to the user) than can be displayed in the viewing area 100 of the list box, then a scroll bar 101 is automatically created. The scroll bar 101 permits the user to traverse all the entries in the list box by moving the slider element 102. The list box control element has the advantage of permitting presentation of multiple entries simultaneously and the immediate interaction with those displayed entries. However, the list box control element has the drawback that the display of multiple entries using the conventional list box can require a lot of space on the GUI.

An example of another GUI control element, commonly referred to as a pop-up menu, is shown in FIG. 2. The pop-up menu, unlike the list box, does not require a specification as to the number of visible rows. In the pop-up menu control element, the amount of data to be presented determines the number of visible rows. However, as shown on the left-hand side of FIG. 2, the pop-up menu, unlike the list box, typically operates in a default state to show a single selection 203 with an indicator 202 that informs the GUI user that other entries can be displayed when the user interacts with the menu. For example, the user can "pop-up" the list of entries 204 by clicking the triangle icon 202 on the menu 200 with the cursor via a mouse. Pop-up menus require minimal amount of display space in their default state. However, they require additional operations by the user in order to display and interact with the data to be presented and they are not convenient for large amounts of data.

Accordingly, as part of the continued evolution of GUIs generally, there exists a need for a new GUI control elements which optimally use the available space for displaying items to the user.

SUMMARY OF THE INVENTION

It is an objective of the present invention to provide a method and GUI control element which optimally present a list of items for both large and small amounts of available display space.

The above-identified and other objectives are achieved by combining the features of the menu and list control elements into a GUI control element which is capable of displaying data in multiple states, dependent on the amount of data to be displayed and/or the display space available. More specifically, according to exemplary embodiments of the present invention the control element is configured to display data in a first display state or a second display state, based on the amount of display space provided for the control element, wherein the control element, in the first display state, presents the data as a list, and the control element in the second display state, presents a menu which can be accessed to present the data.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows an exemplary display of a conventional list box GUI control element;

FIG. 2 shows an exemplary display of a conventional pop-up menu GUI control element;

FIG. 4 illustrates the display of an exemplary embodiment of the invention in its menu state;

FIG. 5 illustrates the display of an exemplary embodiment of the invention in its list state;

DETAILED DESCRIPTION

In the following description, for the purpose of explanation and not limitation, certain details are set forth, such as particular techniques, steps, and system components, in order to provide a thorough understanding of the present invention. However, it will be apparent to those skilled in the art that the present invention may be practiced in other embodiments that depart from these details. In other instances, detailed descriptions of well-known concepts and methods have been omitted so as not to obscure the description of the present invention.

Figure 3A:
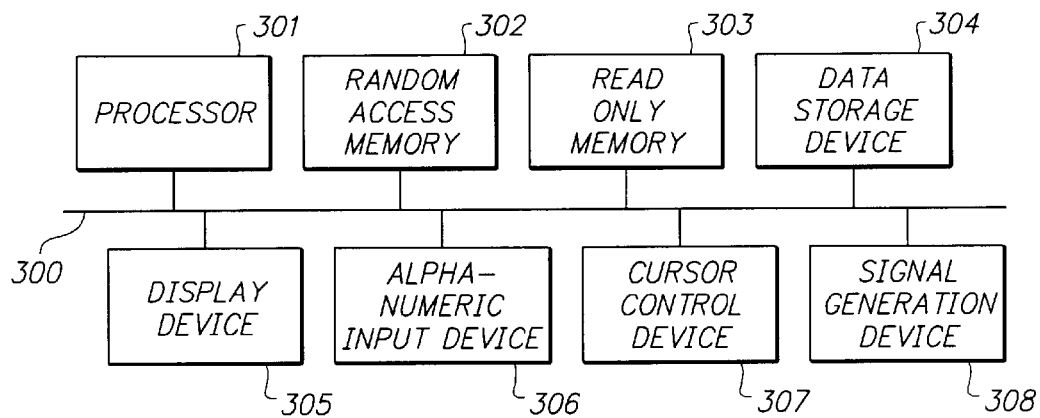
FIGS. 3(a) and (b) show a general computer system with which the present invention may be implemented.

It will be readily appreciated by those skilled in the art that the techniques described herein may be implemented on any of a number of computing systems. In general, such computing systems, as illustrated in FIG. 3(a), comprise a bus 300 for communicating information, a processor 301 coupled with the bus for processing information and instructions, a random access memory 302 coupled with the bus 300 for storing information and instructions for the processor 301, a read only memory 303 coupled with the bus 300 for storing static information and instructions for the processor 301, a data storage device 304 such as a magnetic disk and disk drive or CD ROM drive coupled with the bus 300 for storing information and instructions, a display device 305 coupled to the bus 300 for displaying information to the computer user, an alpha-numeric input device 306 including alpha-numeric and function keys coupled to the bus 300 for communication information and command selections to the processor 301, a cursor control device 307 (e.g., a mouse) coupled to the bus for communicating information and command selections to the processor 301, and a signal generation device 308 coupled to the bus 300 for communicating command selection to the processor 301.

The display device 305 utilized with the computer system and the present invention may be a liquid crystal device, cathode ray tube, or other display device suitable for creating images and/or alphanumeric characters (and/or ideographic character sets) recognizable to the user. The cursor control device 307 allows the computer user to dynamically signal the two dimensional movement of a visible symbol (cursor) on a display screen of the display device 305. Many implementations of the cursor control device are known in the art including a trackball, mouse, joystick or special keys on the alphanumeric input device 306 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device.

Figure 3B:
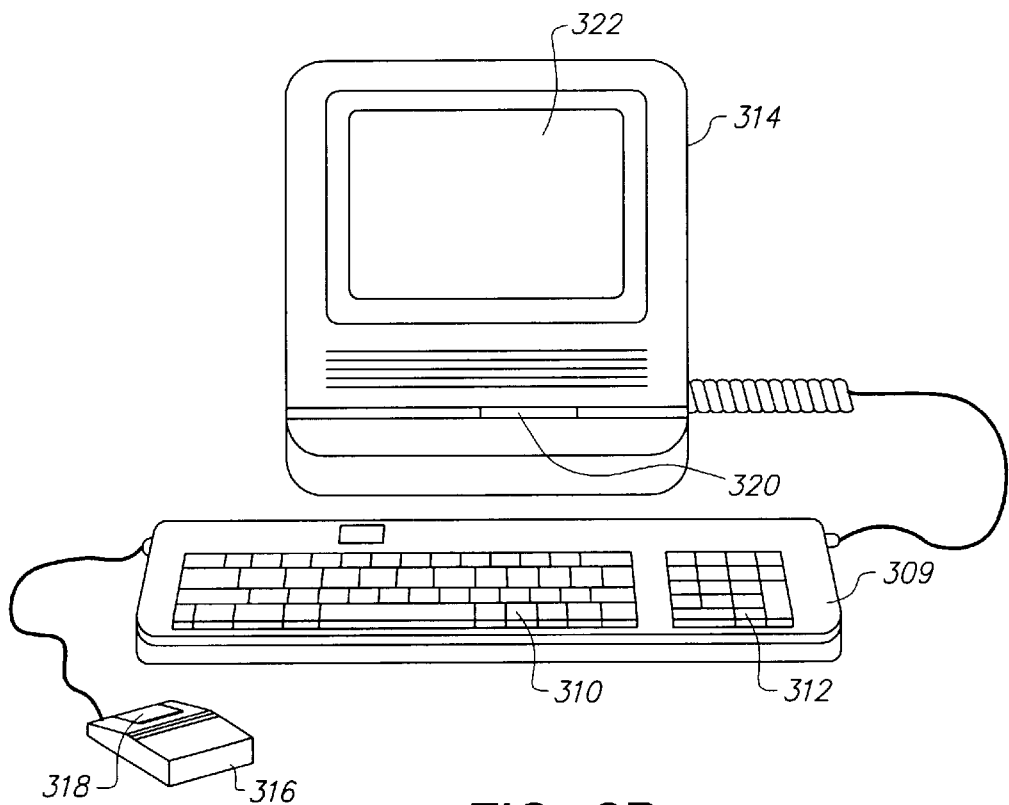

FIG. 3(b) illustrates an exemplary computer system in which the present invention can be implemented. It will be appreciated that this computer system is one of many computer systems that can include the present invention. Therein, a keyboard 309 with keys 310 and keypad 312 is attached to the computer 314 along with a mouse device 316 and mouse push button(s) 318 for controlling the cursor. The mouse device 316 and push button 310 make up an exemplary cursor control device 307. It will be appreciated that many other devices may be used as the cursor control device 307, for instance the keyboard 309 may be substituted for the mouse device 316 and button(s) 318 as just discussed above or, alternatively, a touch-sensitive screen or speech recognition device (not shown) may be used. The computer 314 also typically contains a one or more media drives 320 (e.g., floppy disk, hard disk or CD ROM) and a display screen 322.

Having described exemplary computer systems in which user interfaces and control elements according to the present invention can be implemented, the discussion now turns to a description of such user interfaces. According to exemplary embodiments of the present invention, the display features of both the list box and the pop-up menu are combined to form a new GUI control element capable of optimizing the available display space by presenting data to the user in one of two possible display states. This new GUI control element is referred to herein as a menu-list. The first display state of the menu-list control element 400, referred to herein as the menu state, is illustrated in FIG. 4.

Therein, the menu state presents the user with a single selection 404 which can be accessed to further display data on the GUI to the user. In common with conventional menu control elements, the menu state of the menu-list control element includes a triangular control icon 406. The functionality and manipulation of pull-down or pop-up menus per se has been described above and, therefore, is not discussed in detail here again.

As shown in FIG. 5, the list state of the menu-list control element 400 presents the data to the user as a list 501. Data presented to the user in the menulist control element 400. (in either its menu or list state) can be any kind of information, such as text, icons, symbols or any combination thereof. If there are more entries than visible rows, then a scroll bar 503 is automatically created to allow the user to traverse all the entries within the visible rows 501.

Figure 7:
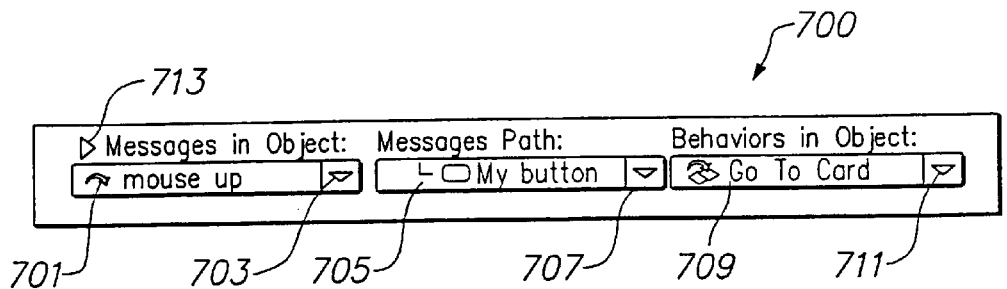
FIG. 7 illustrates the display of another exemplary embodiment of the invention in its menu state.

FIG. 7 illustrates another exemplary embodiment of the menu-list control element in its menu state. In this embodiment, the menu-list control element presents multiple menu selections 701, 705, 709 which may be accessed to further display data to the user via the associated control icons 703, 707, 711 as discussed above with respect to the single menu-list control element.

Figure 8:
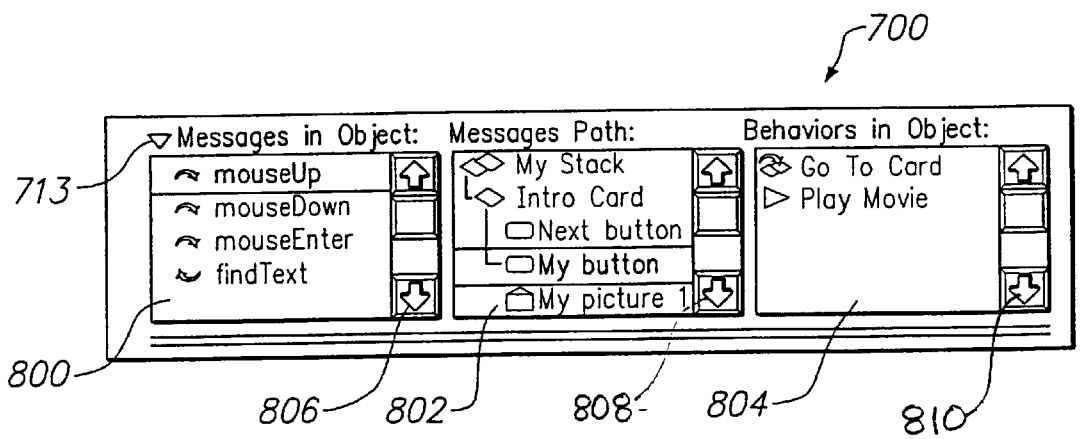
FIG. 8 illustrates the display of another exemplary embodiment of the invention in its list state.

The multiple menu-list control element in its list state is shown in FIG. 8. As shown in the multiple visible display areas 800, 802, 804, data presented to a user using the multiple menu-list control element (in either its menu or list state) can be any kind of information, such as text, icons, symbols or any combination thereof. The list state of the multiple menu-list element 700 presents data to the user as multiple lists 800, 802, 804. Again, as with the single menu-list control element, if there are more entries than visible rows, then scroll bars 806, 808, 810 are automatically created.

According to an embodiment of the invention, the menu-list control is configured display data in either the menu or list state, dependent on the amount of data to be displayed and/or the display space available for use by the menu-list. The amount of space allocated to the menu-list control element may be a static value supplied, for example, by the application developer, or alternatively it may be a dynamic value calculated at runtime. For example, the amount of space allocated to the menu-list control could be derived from the amount of space remaining after space requirements have been determined for the other user interface elements on the display device. Alternatively, the desired size of the menu-list control element can be based on input data, for example, data received over a network.

The amount of space determined to be available can, in and of itself, determine the display state of the menu-list, e.g., if there is only sufficient space to display one selection, then the menu-list control element would display the data in the menu state. However, if the space determined to be allocated to the menu-list control element is greater than a predefined value, for example, two rows, then the data to be displayed is also taken into account in determining the display state of the menu-list control element. For example, assume that the space allocated to the control element is sufficient to display four rows of data and the data to be displayed consists of 5 selections. As a result the menu-list control element can be configured to display the data in the menu state. However, if the data to be displayed consists of 30 selections, the menu-list control element can be configured to display the data in the list state.

According to another embodiment of the invention, the menu-list control element is configured to dynamically transition between display states based on user manipulation with the menu-list control element. For example, as shown in FIG. 4, the menu-list control element 400 further provides a resize gadget 408 which allows the user to manipulate the amount of space allocated to the menu-list control element. This can be accomplished by, for example, moving the cursor 410 over the resize gadget 408, depressing a mouse button 318 and dragging the resize gadget 408 downwardly. The GUI can effect a visible change in the cursor 410, e.g., from an arrow representation to a hand representation which appears to grab the resize gadget, in order to inform the user that the cursor 410 is in position to operate on the menu-list control element 400. If the user resizes the control element such that an adequate amount space is available to display a predetermined amount of data, for example, two or more rows, the menu-list control element will transition into a second display state, referred to as the list state. As seen in FIG. 5, the menu-list control element 400 retains the resize gadget 408 in its list state. If the user drags the resize gadget upwardly using cursor 410 such that the list space is reduced to less than the predetermined amount, e.g., two rows, then the menu-list control element will revert to its menu state.

Alternatively, the menu-list can be configured to dynamically transition between the menu and list states in response to user manipulation of other elements within the GUI. For example, the amount of space allocated to the menu-list control element can be derived from the amount of space remaining after the sizes have been determined for the other user interface elements on the display device. Accordingly, the user can indirectly control the space allocated to the menu-list control element by resizing other user interface elements.

Figure 6:
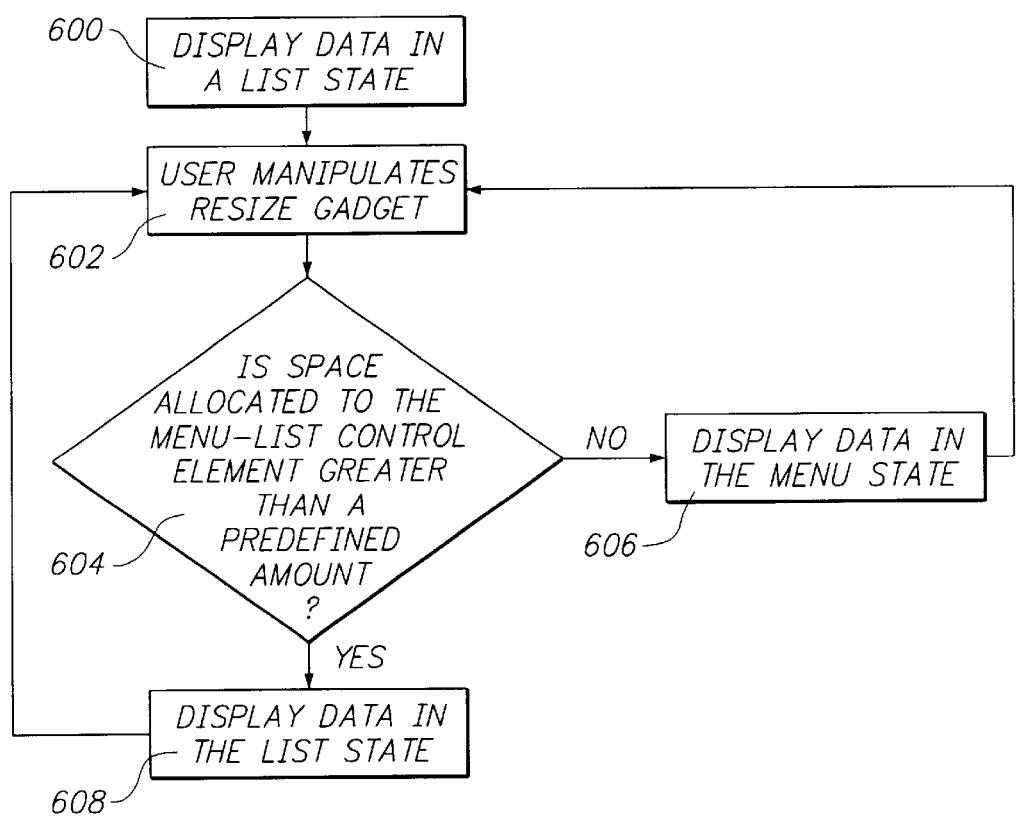
FIG. 6 shows a flow chart describing determination of the control element display state according to an exemplary embodiment of the invention.

FIG. 6 illustrates a method for displaying data to a user on a GUI according to an exemplary embodiment of the invention. As shown in FIG. 6, which begins with step 600, upon initiation of the menu-list control element, data is displayed to the user in a first state. The initial display state is either the menu state or the list state, the determination of which can be predefined or designated at run-time based on the amount of data be displayed. For example, if there are more than three but less than fifteen items to be presented to the user using the menu-list control element then the initial display state may be the menu state. However, if there are more than fifteen items to be presented, the initial state of the menu-list control element may be set to the list state. In either case, once the data has been initially displayed, the user can control which state the data is displayed in, as indicated in step 602. The user can manipulate the resize gadget, for example, by selecting and dragging the gadget to a new location, thereby increasing or decreasing the amount of space allocated to the control element. In step 604, if the allocated space is greater than a predefined amount, for example, two or more rows, then control flows to step 608, wherein the data is displayed in the list state. However, if the allocated space is not greater than the predefined amount, the data is displayed in the menu state in step 606. Those skilled in the art will appreciate that the range (or threshold) of the number of items which is used to determine the initial display state can vary and may be set by the user or the application which generates the menu-list control element.

Alternatively, the menu-list control element in its menu state can provide a transition gadget 713 to allow the user to transition the display of the menu-list from its menu state to its list state and vice versa. Accordingly, if the user activates the transition gadget 713, for example, by selecting it with the mouse or other pointing device, the menu-list control element will transition from the menu state to the list state. As seen in FIG. 8, the menu-list control element 700 retains the transition icon 713 in its list state. This permits the user to transition the multiple menu-list control element to its menu state. Unlike the resize gadget 408, discussed above, the transition icon or disclosure triangle does not require that the user resize or drag the menu-list control element. To activate the transition icon or disclosure triangle 713 the user need only select the icon, e.g., click it with the mouse or other pointing device.

Figure 9:
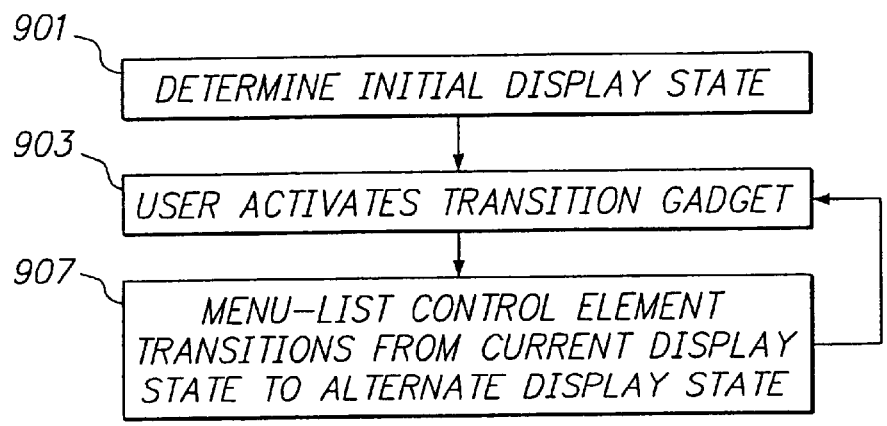
FIG. 9 shows a flow chart describing a method for determining a control element display state according to an exemplary embodiment of the invention.

FIG. 9 shows a flow chart describing a method for reconfiguring the menu-list control element from its menu state to its list state and vise versa according to another exemplary embodiment of the invention. As shown in FIG. 9, which begins with step 901, data is displayed to the user in a first state upon initiation of the control element. As discussed previously with regard to FIG. 6, the initial display state of the menu-list control element is either the menu state or the list state. Again, in either case, once the data has been initially displayed, the user can control which state the data is displayed in, as indicated in step 903. At step 903, the user can manipulate the transition gadget, for example, by selecting it with the mouse or other pointing device. Then, in step 907, the control element with transition from it current display state to it alternate display state. For example, if the control element is currently in the menu state and the transition gadget is activated, then the control element will transition to the list state and vise versa.

The invention has been described with reference to particular embodiments. However, it will be readily apparent to those skilled in the art that it is possible to embody the invention in specific forms other than those of the preferred embodiments described above. This may be done without departing form the spirit of the invention. Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a graphical user interface, a method of presenting data using a control element, the method comprising the steps of:

determining, by the graphical user interface, an amount of display space available to display said data; and configuring, by the graphical user interface, the control element to display said data in one of a first display state and a second display state based on the amount of display space determined to be available, wherein said control element, in said first display state, presents said data as a list, and said control element in said second display state, presents a menu which can be accessed to present said data.

2. The method according to claim 1, wherein said step of determining the amount of display space available is responsive to user manipulation of a portion of said control element.

3. The method according to claim 2, wherein said portion of said control element is a resize gadget.

4. The method according to claim 1, wherein said step of determining the amount of display space available is derived from the amount of space remaining after space is allocated to the other user interface elements on the display device.

5. The method according to claim 1, wherein said step of determining the amount of display space available is derived from input data.

6. The method according to claim 1, wherein the data to be presented is a combination of text and graphical icons.

7. The method according to claim 1, wherein configuring said control element to present data as a list comprises:

presenting said data to the user as a sequence of entries in a display area, wherein said display area is created by a number of visible rows and wherein if there is more data than visible rows within the display area, a scroll bar is created to allow the user to traverse said data within said display area.

8. The method according to claim 1, wherein configuring said control element to present data as a menu comprises:

presenting to the user a single selection with an indication that said selection can be accessed to display said data to the user.

9. A computer-readable medium comprising a control element for presenting data in a graphical user interface, said control element comprising:

a first display state in which said control element presents said data as a list;

a second control state in which said control element presents a menu which can be accessed to present said data;

means for determining the amount of display space available; and means for displaying said data in one of said first display state and said second display state based on the amount of display space determined to be available.

10. The control element according to claim 9, wherein said means for determining the amount of display space available is responsive to user manipulation of a control.

11. The control element according to claim 10, wherein said control is a resize gadget.

12. The control element according to claim 10, wherein said control is a button.

13. The control element according to claim 9, wherein said means for determining the amount of display space available derives the amount of display space available from the amount of space remaining after space is allocated to the other user interface elements on the display device.

14. The control element according to claim 9, wherein said means for determining the amount of display space available derives the amount of display space available from input data.

15. The control element according to claim 9, wherein the data to be presented is a combination of text and graphical icons.

16. A computer-readable medium containing a computer program that performs the steps of:

determining the amount of display space available to display data; and configuring the control element to display said data in one of a first display state and a second display state, based on the amount of display space determined to be available, wherein in said first display state said data is presented as a list, and in said second display state said data is presented as a menu.

17. The computer-readable medium of claim 16 wherein:

the control element, in said first display state, presents said data as a list; and the control element in said second display state, presents a menu which can be accessed to present said data.

18. The computer-readable medium according to claim 17, wherein said step of determining the amount of display space available is responsive to user manipulation of a control.

19. The computer-readable medium according to claim 18, wherein said control is a resize gadget.

20. The computer-readable medium according to claim 18, wherein said control is a button.

21. The computer-readable medium according to claim 17, wherein said step of determining the amount of display space available is derived from the amount of space remaining after space is allocated to the other user interface elements on the display device.

22. The computer-readable medium according to claim 17, wherein said step of determining the amount of display space available is derived from input data.

23. The computer-readable medium according to claim 17, wherein the data to be presented is a combination of text and graphical icons.

24. A computer system comprising:

a display device; and a processor which controls said display device, said processor configured to perform the steps of:

determining the amount of display space available to display data; and configuring the control element to display said data in one of a first display state and a second display state, based on the amount of display space determined to be available, wherein in said first display state said data is presented as a list, and in said second display state said data is presented as a menu.

25. The system of claim 24, wherein:

the control element, in said first display state, presents said data as a list; and the control element in said second display state, presents a menu which can be accessed to present said data.

26. The system of claim 25, wherein said step of determining the amount of display space available is responsive to user manipulation of a control.

27. The system of claim 26, wherein said control is a resize gadget.

28. The system of claim 26, wherein said control is a button.

29. The system of claim 25, wherein said step of determining the amount of display space available is derived from the amount of space remaining after space is allocated to the other user interface elements on the display device.

30. The system of claim 25, wherein said step of determining the amount of display space available is derived from input data.

31. The system of claim 25, wherein the data to be presented is a combination of text and graphical icons.

* * * * *